United States Patent [19]

Dye et al.

[11] Patent Number: 4,986,675

[45] Date of Patent: Jan. 22, 1991

[54] SELF-ALIGNING BEARING

[75] Inventors: Clifford L. Dye, Eaton Rapids; Leon D. Greenwood, Okemos; Mark T. Traxler, Lansing; Lawrence J. Noren, III, Springport, all of Mich.

[73] Assignee: Eaton Indiana, Inc., Nappanee, Ind.

[21] Appl. No.: 364,161

[22] Filed: Jun. 12, 1989

[51] Int. Cl.$^5$ .............................................. F16C 25/04
[52] U.S. Cl. ...................................................... 384/192
[58] Field of Search ................ 384/192, 296, 439, 206, 384/903; 464/158, 181, 183

[56] References Cited

U.S. PATENT DOCUMENTS

| | | | |
|---|---|---|---|
| 2,376,406 | 5/1945 | Weingart | 384/439 |
| 3,953,158 | 4/1976 | Uppal | 464/158 |
| 4,213,660 | 7/1980 | Yasui et al. | 384/903 |

Primary Examiner—Lenard A. Footland
Attorney, Agent, or Firm—Beaman & Beaman

[57] ABSTRACT

A self-aligning bearing having a generally cylindrical body including an outer cylindrical surface and circumferentially spaced projections formed on the body having an outer diameter slightly greater than the diameter of the socket in which the bearing is received. The bearing is provided with a bore to rotatably receive the shaft of a rotational component and is pressed into a generally cylindrical socket wherein the projections shave at least some axial length of the inside wall of the socket to a precise fit preventing rotation of the bearing therein. The precise fit extends a relatively short axial distance, resulting in clearance features between the outer surface of the assembled bearing and the socket wall which permit limited angular displacement of the bearing and allow the bearing to self align relative to the socket and yet maintain sufficient alignment to permit easy assembly of a shaft within the bearing.

15 Claims, 2 Drawing Sheets

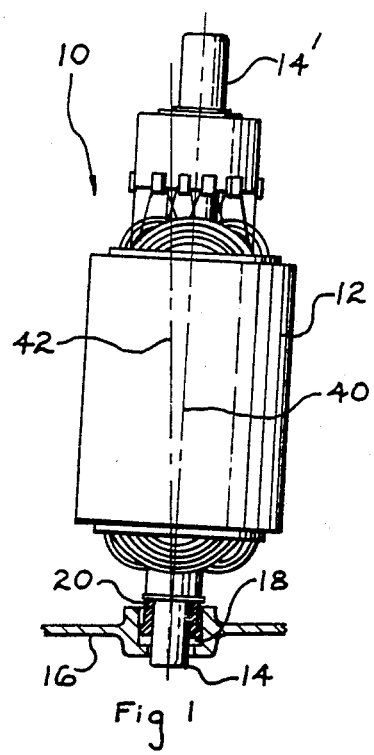
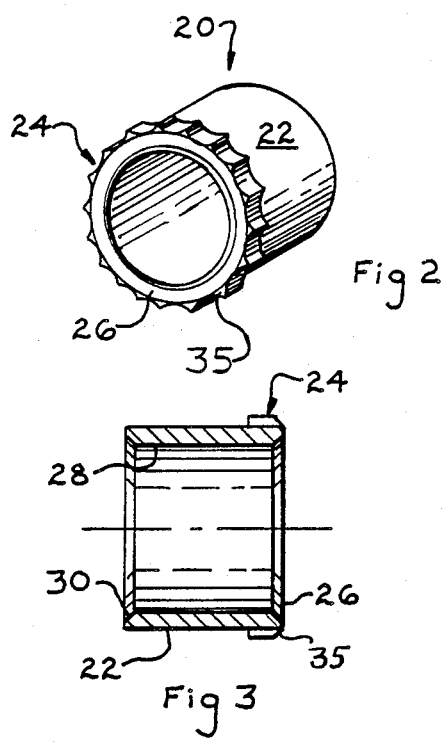
Fig 1
Fig 2
Fig 3
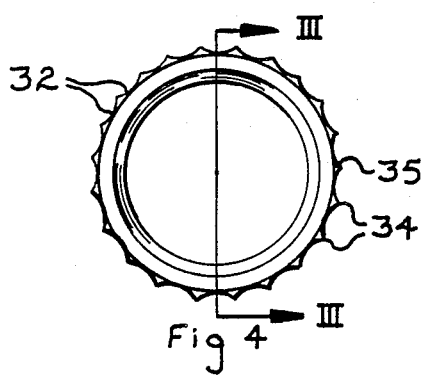
Fig 4
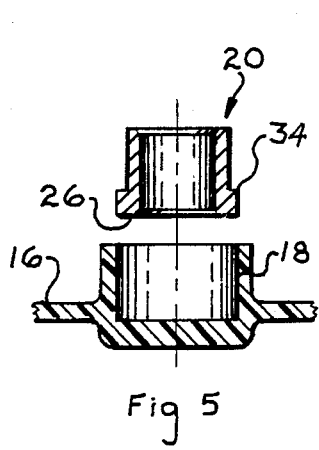
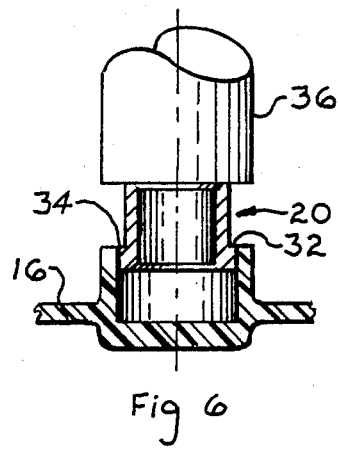
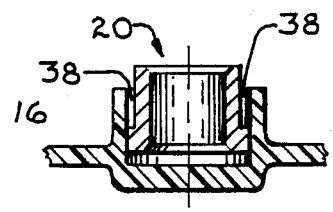
Fig 5
Fig 6
Fig 7

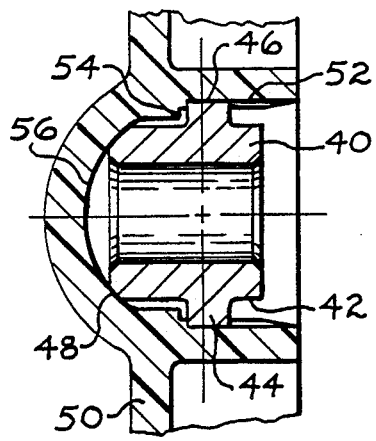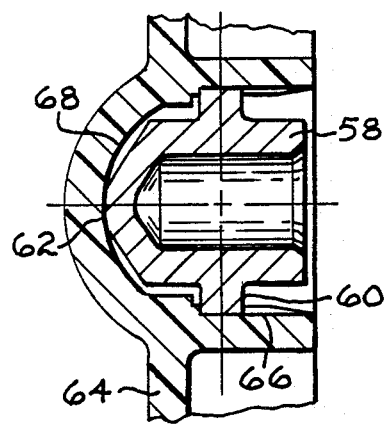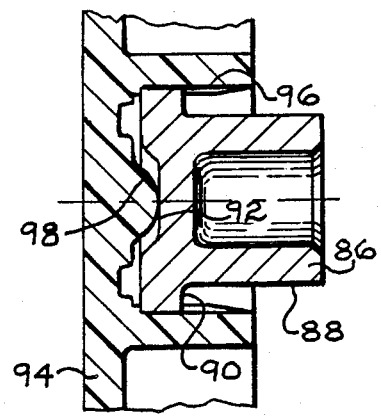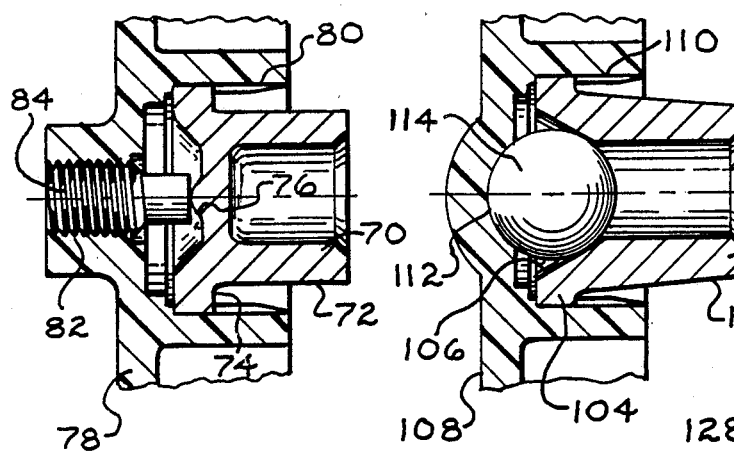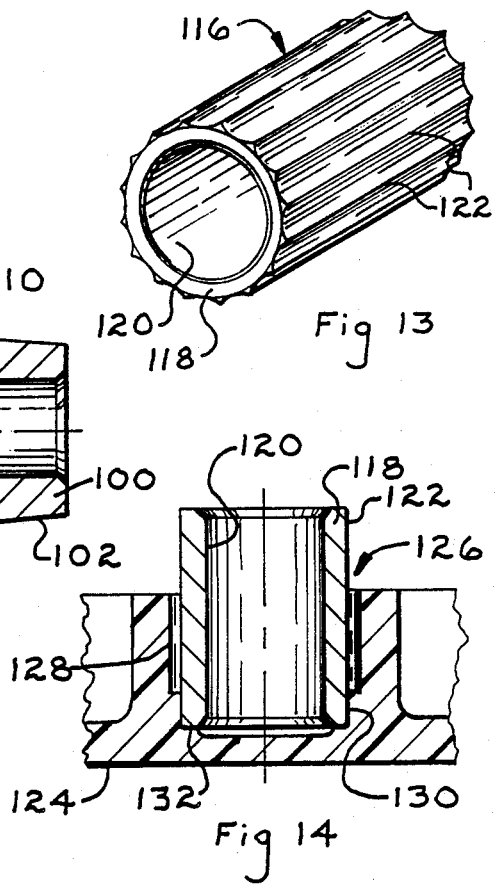

SELF-ALIGNING BEARING

BACKGROUND OF THE INVENTION

The invention pertains to an improved self-aligning bearing for use in end frames of electric motor drive units and the like.

Most self-aligning bearings for small motors are of the spherical outside diameter type which add significant cost to the motor assemblies and require pre-alignment before assembly. In recent years, designs similar to those described in the assignee's U.S. Pat. No. 4,318,573 have been successfully applied. Those bearings have a bore for receiving the shaft of an electric motor and have a generally cylindrical body with some type of outwardly extending anti-rotation feature. Such anti-rotation features might be keys that are received within slots defined in the bearing socket, which requires rotational positioning of the bearing prior to assembly.

Non-self-aligning bearings have been disclosed previously which have similar anti-rotation device shapes to those suggested for this invention but those prior art features must be assembled to a non-moveable press fit. Typical examples of these types of bearings are shown in U.S. Pat. Nos. 2,376,406 and 2,989,354 wherein the anti-rotation features are a plurality of broaching projections located adjacent a leading pilot portion wherein during assembly the pilot portion is inserted in the socket allowing the bearing to align itself with the socket before the projections eventually reach the socket and shave or displace the socket wall to a tight fit. Bearings of this type require accurately located, aligned and machined sockets into which the bearings are inserted which add cost to the product. Also, because of the close fitting nature of the bearings for concentric alignment the bearings are not capable of angular displacement necessary for receiving the shaft of a rotating component not accurately aligned.

One bearing that does provide for the necessary angular displacement is shown in U.S. Pat. No. 3,115,373, however, an adhesive mounting resin is used to permanently hold the bearing in a rigid position that requires a time of setting, which, in addition to the cost of the material, adds to the manufacturing cost of the product and does not allow later realignment as necessary to accommodate disassembly and reassembly.

It is an object of the invention to provide an improved self aligning bearing that is of low manufacturing cost and permits angular displacement during assembly of parts to accommodate for bearing sockets that are not in line, such that the bearing aligns itself with its associated rotating component.

A further object of the invention is to provide a self aligning bearing to accommodate bearing sockets that are not in line wherein projections on the bearing shave or displace the socket to a precise fit by merely pressing the bearing into its associated socket.

Another object of the invention is to provide a self aligning bearing that is merely pressed into its associate socket and wherein the resulting fit is sufficient to carry the radial loads and yet allow angular displacement of the centerline of the bearing as required for self alignment during assembly and operation yet limits the angular position of the assembled bearing to assure sufficient alignment for easy assembly of a shaft into the bearing.

Yet still a further object of the invention is to provide a self aligning bearing wherein rotational positioning of the bearing prior to assembly is not required and variations in socket geometry can be tolerated.

In the preferred embodiment of the invention the self aligning bearing has a cylindrical body with a narrow band of circumferentially spaced projections extending outwardly from the outer surface and a shaft receiving bore therethrough. The projection area becomes the supporting structure for the bearing as it is received within the socket.

The ring of projections usually has an axial length of less than 50% of the outside diameter of that ring. With that geometry the incremental angular deflection of the shaft causes only small incremental radial deformation on the bearing pocket. The resulting change in radial retaining forces on the bearing are therefore so low that the tendency for the socket to urge the bearing angle of centerline toward the socket centerline is insignificant. Thus the bearing is free to align and stay aligned with the shaft. It can be appreciated that bearings with axially longer mounting surfaces relative to their diameter would not as freely align and would deliver excessive friction to the rotating shaft. An annular space adjacent to the ring of projections can be a feature of either the bearing or the socket in order to permit angular displacement of the bearing upon assembly of the rotating component not on a common centerline with the socket.

BRIEF DESCRIPTION OF THE DRAWINGS

The aforementioned objects and advantages of the invention will be appreciated from the following description and accompanying drawings wherein:

FIG. 1 is an elevational view, partially in section, illustrating an electric motor armature utilizing inventive concepts in accord with the invention, FIG. 2 is a perspective view of one embodiment of a selfaligning bearing in accord with the invention, FIG. 3 is an elevational sectional view as taken along Section III—III of FIG. 4, FIG. 4 is an end view of the self-aligning bearing as taken from the right of FIG. 3, FIG. 5 is an enlarged detail elevational sectional view of the self-aligning bearing aligned within socket and prior to assembly, FIG. 6 is a view similar to FIG. 5 of the self-aligning bearing partially assembled in the bearing socket, and FIG. 7 is a view similar to FIGS. 5 and 6 of the self-aligning bearing fully assembled within its socket, FIG. 8 is an enlarged elevational sectional view of another embodiment of the invention illustrating a bearing received within a motor end plate, FIG. 9 is an elevational detail enlarged sectional view of another embodiment of a bearing as assembled within a bearing socket, FIG. 10 is yet another embodiment of the invention constituting an enlarged detail elevational sectional view of a bearing inserted within a socket having a threaded adjustment, FIG. 11 is an elevational detail sectional view of a further embodiment of a bearing utilizing the inventive concepts as located within a socket, FIG. 12 is an additional embodiment of the invention comprising an elevational detail sectional view illustrating the bearing within a motor end wall socket, FIG. 13 is a perspective view of another embodiment of a bearing in which the inventive concepts may be practiced, and FIG. 14 is an elevational detail sectional view illustrating the bearing embodiment of FIG. 13 as located within a motor end wall socket in the practice of the invention.

DESCRIPTION OF THE PREFERRED EMBODIMENTS

A conventional electric motor utilizing inventive concepts in accord with the invention is partially shown in FIG. 1. The motor armature 10 consists of an armature core and coils 12 and a pair of armature journals 14,14'. In use, the electric motor armature 10 is supported upon bearings mounted within the end frames or end caps of the electric motor casing, where the armature journals 14,14' are rotatably supported within the bearings, as is known.

For purpose of illustration only a single end frame 16 of an electric motor casing is shown in FIG. 1 having a cylindrical socket 18 which is of sufficient axial dimension for receiving the self-aligning bearing 20 which constitutes the subject matter of the invention. The self-aligning bearing 20 is pressed into the socket 18 and receives the journal 14. The bearing is made of a metal material whereas, the end frame may be made of a synthetic plastic or metal material softer than that of the bearing.

The configuration of the self-aligning bearing 20 will be best appreciated from FIGS. 2-7. The bearing 20 is of a generally annular cylindrical form having a cylindrical outer surface 22 intersecting a narrow band of projections 24 located adjacent end 26. The bearing is provided with a cylindrical bore 28 to rotatably support the associated armature journal and also includes a counterbore 30 for aiding in the insertion of the journal.

The narrow band of projections 24 is formed on an annular shoulder adjacent end 26 and may be formed by knurling resulting in cylindrical indentations 32 intermediate outwardly defined sharp cutting teeth 34. The teeth 34 may also be formed by cutting splines in the shoulder by removing the shoulder metal and include a chamfer 35 on their leading edges.

The narrow band of projections 24 constitutes only a portion of the axial length of the bearing 20 and in one embodiment has an outer diameter approximately 0.015 inches greater than the diameter of the bearing surface 22. This creates a space between the bearing surface 22 and the wall of socket 18 when the bearing is assembled, as later described.

The assembly of the self-aligning bearing 20 and the socket 18 is shown in FIGS. 5-7. To assemble, the bearing end 26 is aligned with the socket 18 as shown in FIG. 5. A press plunger 36 is used to axially force the bearing 20 into the socket 18 as shown in FIG. 6 and as the diameter of the edges 34 and projections 24 are greater than the diameter of socket 18 the teeth 34 displace or shave the socket wall to a precise fit as the bearing is fully inserted as shown in FIG. 7 and the chamfer 35 reduces the formation of loose chips. The annular space 38, between the bearing surface 22 and the socket wall 18 results from the fact that the diameter of surface 22 is less than the socket diameter and permits limited angular displacement of the bearing 20 relative to the socket when receiving the armature journal 14 to accommodate the minor misalignment of bearing sockets when fully assembled yet limit the misalignment of bearing and socket to a reasonable range to aid the assembly process when inserting the shaft into the bearing.

Once the bearing 20 and the socket 18 have been assembled, the journal 14 is inserted within the bore 28. During assembly of the motor end frames, only one end frame being shown, the bearings at armatures 14 and 14' self align with the associated socket such that the centerline of the bearings align with the centerline 40 of the journals even though the centerline of the end frame sockets may be misaligned with respect to each other.

In FIG. 1, the common centerline 40 of the journals and the bearings is shown angularly displaced from the centerline 42 of the socket 18 for purpose of illustration to show how the bearing would accommodate for misaligned sockets, such that when the journal 14' is received by an identical bearing, not shown, the bearings would align with each other along a common centerline to accommodate for out-of-line sockets.

Rotational positioning of the bearing 20 is not required prior to assembly and it can further be appreciated that substantial variations in socket geometry can be tolerated. The embedding of the edges 34 into the socket wall will prevent rotation of the bearing within the socket providing a key against relative rotation.

FIGS. 8-12 illustrate further versions of bearings and sockets utilizing the concepts of the invention, and it is to be understood that the embodiments illustrated have the same advantages as those described above with respect to FIGS. 1-7.

In FIG. 8 an annular bearing body 40 includes an outer cylindrical surface 42 and an annular band 44 of larger diameter than surface 42 includes a plurality of splines or projection teeth 46 defined on the outer periphery. The bearing support, for instance the end wall of a motor is illustrated at 50 and includes a cylindrical socket 52 of a normal diameter less than the diameter of the band 44 and the teeth 46 defined thereon. The socket includes a shoulder 54, and a semispherical surface 56. The shoulder 54 limits the misalignment of the bearing to the practical amount necessary during the assembly process thus serving a function similar to the annular space 38 of the previously described embodiment. Upon pressing the bearing 40 into the socket 52 the teeth 46 will broach and imbed into the socket and the bearing is pushed into the socket until the bearing surface 48, which is of a spherical segment configuration, engages the end wall surface 56 as illustrated. The engagement of the spherical surfaces permits self-alignment of the bearing within the socket 52 in view of the relatively limited axial dimension of the band 44, and the engagement of the spherical surfaces resists axial loads imposed on the bearing 40 to the left.

In the embodiment of FIG. 9 the bearing 58 includes a annular band 60 having the cutting teeth defined on the periphery thereof, and the bushing includes a central convex surface 62 symmetrically located with respect to the longitudinal axis of the bearing 58. The supporting member 64 includes a cylindrical socket 66 defined therein and the socket includes a concave spherical portion 68 wherein insertion of the bearing 58 into the socket 66 the end surface 62 will engage surface 68 permitting self-alignment of the bearing within the socket and permitting axial thrust loads to be imposed on the bearing without bearing displacement.

It will be appreciated that in the embodiments of FIGS. 8 and 9 the annular band upon which the spline teeth are defined are not located at on end of the bearing as in the previously described embodiment. It is to be understood that such "end" location of the spline teeth is not required in order to practice the invention. It is only necessary that the engagement between the spline teeth and the supporting socket be of such limited dimension in the axial direction as to permit limited alignment and tilting of the bearing within the socket, and in the embodiments of FIGS. 8 and 9 rotation of the bearing is prevented by the imbedding of the band teeth into the socket wall and axial forces are effectively resisted due to the engagement of the bearing with the end wall.

In the embodiment of FIG. 10 the bearing 70 includes a cylindrical outer surface 72 having a band 74 of greater diameter defined adjacent the end of the bearing upon which the spline teeth are defined. The bearing includes a recess within its end in which the concentric protuberance 76 is formed which is of a convex configuration. The end wall 78 includes the socket 80 into which the bearing 70 is pressed and the band of teeth imbedded. The end wall also includes a boss in which the threaded hole 82 is defined coaxial with the axis of the socket 80 and the threaded adjustment dog point screw 84 is located within threaded bore 82 having an end engaging the protuberance 76. In this manner the axial position of the bearing 70 within the socket may be very accurately controlled and axial thrust forces imposed on the bearing 70 to the left will be resisted by engagement of the dog point screw 84 with the bearing.

FIG. 11 illustrates a further embodiment of the invention wherein the bearing 86 includes an outer cylindrical surface 88 and a tooth band 90. A coaxial recess 92 is defined in the end of the bearing 86 adjacent to the band 90. The end wall 94 includes the socket 96 into which the bearing 86 is pressed, and the end wall includes a convex protuberance 98 which engages the bearing recess 92 to resist axial thrust forces on the bearing and yet permit the limited tilting and self-aligning required of the bearing.

FIG. 12 discloses a further embodiment of the invention employing a bearing 100 having a conical configuration outer surface 102. The bearing 100 includes an annular band 104 having spine teeth defined in the outer circumference thereof and the bearing also includes a concentric tapered counterbore 106 intersecting the inner end of the bearing. The end wall 108 includes the socket 110 of a cylindrical configuration into which the bearing 100 is pressed, and the end wall also includes a spherical concave recess 112 concentric to the bearing axis. A ball bearing 114 having a diameter corresponding to the surface 112 is positioned between the surface 112 and the bearing counterbore 106 as illustrated and the ball serves to permit the self-alignment of the bearing while resisting axial thrust forces imposed thereon.

In the embodiments of FIGS. 8-12, thrust forces on the bearings are transferred along the bearing center line to the end wall thus causing no bearing displacement and no force couple which would translate thrust loads into angular bearing deflection and result in binding upon the rotating shaft.

In order to permit the self-alignment of the bearing without significant distortion of the bearing socket it is preferable that the axial length of the ring of imbedding projections not be substantially greater than 50% of the diameter of the ring of projections, lower ratios giving more alignment freedom while softer more plastic materials allow higher ratios.

In the aforedescribed embodiments of the invention the spine teeth formed on the outer circumference of the bearing 116 have been located on a band of relatively limited axial dimension with respect to the overall length of the bearing. It is to be understood that the inventive concepts can also be practiced in a bearing 116 such as shown in FIG. 13 wherein the cylindrical bearing body 118 includes a bore 120 extending therethrough and on its outer circumference the bearing body 118 is formed with a plurality of projections or splines forming cutting teeth of the type described above. As will be appreciated, the splines or teeth 122 extend the entire length of the bearing body 118.

As will be appreciated from FIG. 14 the supporting structure 124 such as the end wall of a motor includes a cylindrical socket generally indicated at 126, and the socket includes a cylindrical surface portion 128 and a concentric inner wall portion 130 of lesser diameter than the surface 128. The surfaces 128 and 130 will be smooth and cylindrical. The diameter of the surface 130 is slightly less than the maximum diameter of the bearing 116 as defined by the apices of the teeth 122 while the diameter of the socket surface 128 is greater than the diameter of the apices 122. Thus, when the bearing 116 is pushed into the socket 126 as shown in FIG. 14 the teeth 122 will imbed into the surface 130 but an annular radial clearance exists between the teeth 122 and the socket surface 128 which serves a function identical to the space 38 of FIG. 7 to limit the misalignment of the bearing to the practical amount necessary during the assembly process. Typically the bearing is inserted into its socket until the body portion 118 rests against the annular end wall 132 and it will be appreciated that angular deflection of the bearing during alignment will cause some portions of the bearing end wall to depart slightly from the socket end wall. As the axial dimension of the socket wall portion 130 is minor with respect to the outside diameter of the bearing the self-alignment of the bearing within the socket 126 will be achieved as described above, and it is to be understood that the basic concepts of the self-alignment of the bearing with respect to the embodiment shown in FIGS. 13 and 14 is identical to the concepts explained with respect to FIGS. 1-7.

It is appreciated that various modifications to the inventive concepts may be apparent to those skilled in the art without departing from the spirit and scope of the invention. For instance, while in the disclosed embodiment the motor end wall is preferably formed of a synthetic plastic material and will be softer than the metallic bearing, it would be possible to form the motor end wall of metal or other material harder than the bearing and form the cutting teeth in the socket wherein upon the insertion of a cylindrical wall bearing into the socket, the socket teeth will imbed into the bearing and the self-alignment achieved will be identical to that described above with respect to the other embodiments. Such an arrangement would appear similar to that shown in FIG. 14 and the spline teeth would be formed upon the socket wall portion 130.

We claim:

1. In combination, a socket member having an axial length, an axis and an inner cylindrical surface, a bearing member having an axial length axis, an axial bore and an outer cylindrical surface, means defining cutting teeth defined on said cylindrical surface of one of said members, the diameters of said members being such that an interference occurs between said bearing member and said socket member at said cutting teeth upon said bearing member being axially inserted into said socket member whereby said cutting teeth imbed into said cylindrical surface of the other member, said cutting teeth defined on said bearing member or said socket member extending up to the length thereof and said socket member or bearing member engagement with said cutting teeth having an axial length not substantially more than 50% of the diameter of said bearing member and said bearing member being radially unrestrained at axial locations remote from the engagement of said cutting teeth with said other member, whereby said bearing member is capable of limited tilting at the engagement of said cutting teeth to permit said bearing member axis to self-align with a shaft within said bore.

2. In a combination as in claim 1, said cutting teeth comprising a circumferential band of teeth.

3. In a combination as in claim 1, said cutting teeth being defined on said bearing member and comprising a circumferential band of teeth.

4. In a combination as in claim 1, said cutting teeth being defined on said socket member.

5. In a combination as in claim 1, said cutting teeth being defined on said socket member and imbedding into said bearing member defining an imbedded band having an axial length not substantially greater than 50% of the diameter of said bearing member.

6. In a combination as in claim 1, said socket member including thrust transmitting means in axial alignment with said bearing member, engaging said bearing member and limiting axial movement of said bearing member into said socket member.

7. In a combination as in claim 6, said thrust transmitting means including a convex surface having a center of generation lying on said bearing member axis.

8. In a combination as in claim 7, said thrust transmitting means including a convex surface having a center of generation lying on said socket member axis.

9. A self-aligning bearing to be pressed into a cylindrical socket having a primary wall portion having a diameter and an axis, including an annular body having an outer surface having a diameter and a shaft receiving bore therein, the improvement comprising the diameter of the body being less than the socket diameter, means defining circumferentially spaced cutting teeth projections extending outwardly from the body outer surface for supporting the bearing body within the socket, said projections having an outer diameter slightly greater than at least a limited portion of the diameter of the socket wall portion whereby upon axially pressing the body into the socket said projections imbed within the socket wall portion of an axial length substantially less than the length of the body thereby supporting the bearing body within the socket against relative rotation and the difference in the diameter of the socket wall portion and the body permitting said bearing to tilt relative to the axis of the cylindrical socket and wherein said limited axial portion of the socket includes an inner diameter having an axial length of engagement with said teeth less than 50% of the diameter of said projections.

10. In a self-aligning bearing as in claim 9, said projections axially extending up to the length of the bearing body.

11. In a self-aligning bearing as in claim 10, wherein said projections comprise a circumferential annular band.

12. In a self-aligning bearing as in claim 10, said projections comprising axially extending splines.

13. In a self-aligning bearing as in claim 10 wherein the axial length of the engagement of said projections with the socket wall portion is not substantially more than 50% of the diametrical dimension of said projections.

14. In a self-aligning bearing as in claim 9, the socket including an end wall in axial alignment with the bearing, and self-aligning thrust transmitting means interposed between the bearing and said end wall.

15. In a self-aligning bearing as in claim 14, said self-aligning thrust transmitting means including at least one convex radiused surface.

* * * * *